(12) United States Patent
Klausner et al.

(10) Patent No.: US 9,710,354 B2
(45) Date of Patent: *Jul. 18, 2017

(54) BASIC BLOCK PROFILING USING GROUPING EVENTS

(71) Applicant: International Business Machines Corporation, Armonk, NY (US)

(72) Inventors: Moshe Klausner, Ramat Yishay (IL); Nitzan Peleg, Haifa (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1 day.

This patent is subject to a terminal disclaimer.

(21) Appl. No.: 14/840,137

(22) Filed: Aug. 31, 2015

(65) Prior Publication Data

US 2017/0060725 A1 Mar. 2, 2017

(51) Int. Cl.
G06F 9/44 (2006.01)
G06F 11/34 (2006.01)
G06F 9/30 (2006.01)
G06F 11/30 (2006.01)

(52) U.S. Cl.
CPC ...... *G06F 11/3495* (2013.01); *G06F 9/30145* (2013.01); *G06F 11/302* (2013.01)

(58) Field of Classification Search
CPC .................................................. G06F 11/3466
See application file for complete search history.

(56) References Cited

U.S. PATENT DOCUMENTS 5,388,233 A * 2/1995 Hays .................. G06F 9/30145
712/208
6,009,514 A 12/1999 Henzinger et al.
6,374,367 B1 4/2002 Dean et al.
(Continued)

FOREIGN PATENT DOCUMENTS

EP 0718758 6/1996

OTHER PUBLICATIONS

List of IBM Patents or Patent Applications Treated as Related, Oct. 21, 2015, 2 pages.
(Continued)

*Primary Examiner* — Hang Pan
(74) *Attorney, Agent, or Firm* — Cantor Colburn LLP; William A. Kinnaman, Jr.

(57) ABSTRACT

An aspect includes performance profiling of an application. A processor executes an instruction stream of the application including instructions that are dynamically grouped at runtime. The processor monitors for an event associated with sampled instructions. A sampled instruction is associated with other events that include instruction grouping information. A number of the instructions in a group that includes the sampled instruction is determined as a group size. The monitored event is tracked as separate events with respect to each of the sampled instruction and one or more other instructions of the group. Subsequent monitored events are tracked as the separate events for each of the instructions from additional groups having various group sizes formed from a sequence of the instructions. An execution count for the sequence of the instructions is generated based on accumulating the separate events over a period of time.

14 Claims, 11 Drawing Sheets

(56) References Cited

U.S. PATENT DOCUMENTS

| | | |
|---|---|---|
| 8,387,026 B1 | 2/2013 | Hundt et al. |
| 8,789,032 B1 | 7/2014 | Li et al. |
| 2004/0049667 A1 | 3/2004 | McCormick, Jr. et al. |
| 2007/0079294 A1 | 4/2007 | Knight et al. |
| 2014/0052970 A1* | 2/2014 | Gara .................. G06F 11/348 712/222 |

OTHER PUBLICATIONS

U.S. Appl. No. 14/918,692, filed Oct. 21, 2015, Entitled: Basic Block Profiling Using Grouping Events, First Named Inventor: Moshe Klausner.

D. Chen, et al., "Taming Hardware Event Samples for FDO Compilation," CGO 2010, Apr. 24-28, 2010, Toronto, Ontario, Canada, 11 pages.

D. Levinthal, PhD., "Performance Analysis Guide for Intel® Core™ i7 Processor and Intel® Xeon™ 5500 processors," Version 1.0, 2008-2009 Intel Corporation, 72 pages.

J.M. Anderson, et al., "Continuous Profiling: Where Have All the Cycles Gone?," Digital Equipment Corporation, ACM Transactions on Computer Systems, vol. 15, No. 4, Nov. 1997, pp. 357-390.

M.D. Smith, "Overcoming the Challenges to Feedback-Directed Optimization," Proceedings of the ACM SIGPLAN Workshop on Dynamic and Adaptive Compilation and Optimization (Dynamo '00), Boston, Jan. 18, 2000, 11 pages.

Xiaolan Zhang, et al., "System Support for Automatic Profiling and Optimization," SIGOPS Operating Systems Review, 31(5): 15-26, Oct. 1997.

* cited by examiner

|  | Cg1 | Cg2 | Cg3 | Cycles | IC |
|---|---|---|---|---|---|
| X | 308 |  | 3692 | 4000 | 3250 |
| X+1 |  | 500 |  | 500 | 400 |
| X+2 |  |  |  |  |  |
| X+3 |  | 350 | 3150 | 3500 | 3000 |
| X+4 |  |  |  |  |  |
| X+5 | 300 |  |  | 300 | 170 |

FIG. 10

BASIC BLOCK PROFILING USING GROUPING EVENTS

BACKGROUND

The present invention relates to computer system performance profiling, and more specifically, to basic block profiling based on sampling using grouping events.

Feedback-directed optimization (FDO) has proven useful in improving performance of computer application execution when FDO is incorporated into code optimization tools such as an optimizing compiler or binary level optimizer. A profiler is typically implemented in an execution environment that applies representative input to exercise an application with expected conditions that represent real-world use of the application or at runtime while the application is running at user site. The profiler can collect information such as basic block execution frequency or branch taken/not taken execution frequency, where a basic block is defined as a portion of code with only one entry point and only one exit point. The data collected from profiling (i.e., feedback information) can be used as training data for a code optimization tool to make better optimization decisions as FDO.

Some optimizing compilers that apply FDO use instrumentation to collect feedback information. However, this approach has significant overhead. Another approach to collect feedback information is to use hardware event sampling, which has lower overhead as compared to adding instrumentation to the application.

A common way to estimate a basic block profile is to sample a hardware counter, e.g., using a performance monitoring unit (PMU), that increments each time an instruction retires/completes. Each time the counter overflows upon reaching a predefined threshold, the instruction address is sampled by reading a program counter. Instruction retire samples are not equally distributed in each basic block, since within a group of multiple instructions that are retired/completed together one instruction that represents the group, for example, the first instruction in the group is sampled.

To solve this issue, several prior art solutions calculate an estimated average sample count in the basic block. The sample counts of all observed instructions in the basic block are typically summed and normalized by the total number of instructions in the basic block. This approach can be useful in estimating how frequently a particular instruction within the basic block is executed; however, accuracy of the estimated execution frequency is reduced in processors that group instructions dynamically at run-time, as the distribution of group assignments and group sizing within a basic block can vary over a period of time when the basic block is executed for multiple iterations.

SUMMARY

According to embodiments of the present invention, a method, system, and computer program product are provided for performance profiling of an application in a computer system. A processor of the computer system executes an instruction stream of the application including a plurality of instructions that is dynamically grouped at run-time. The processor monitors for an event associated with sampled instructions from the instruction stream. A sampled instruction is associated with other events that include instruction grouping information. A number of the instructions in a group that includes the sampled instruction is determined as a group size. The monitored event is tracked as a plurality of separate events with respect to each of the sampled instruction and one or more other instructions of the group. A plurality of subsequent monitored events is tracked as the separate events for each of the sampled instruction and one or more other instructions from additional groups of the instructions having various group sizes formed from a sequence of the instructions. An execution count for the sequence of the instructions is generated based on accumulating the separate events over a period of time. An advantage includes increased accuracy in the computation of the execution count.

In addition to one or more of the features described above or below, or as an alternative, further embodiments could include where the monitoring is performed periodically based on a sampling interval. An advantage includes controlling a frequency of sampling to lower the profiling overhead with respect to application execution.

In addition to one or more of the features described above or below, or as an alternative, further embodiments could include where the separate events are tracked as instruction counts for each different value of the group size, and the execution count is based on a summation of the instruction counts for each different value of the group size on an instruction basis and computed across the sequence of the instructions. An advantage includes increased accuracy by computing across multiple instructions and group sizes, where the separate events are tracked as instruction counts.

In addition to one or more of the features described above or below, or as an alternative, further embodiments could include where the separate events are tracked as a number of cycles for each different value of the group size, a weighted instruction count per instruction is computed on a group size basis, a plurality of calculated instruction counts is determined based on the weighted instruction count per instruction and the number of cycles for each different value of the group size, and the execution count is based on a summation of the calculated instruction counts for each different value of the group size on an instruction basis and computed across the sequence of the instructions. An advantage includes increased accuracy by computing across multiple instructions and group sizes, where the separate events are tracked as a number of cycles.

In addition to one or more of the features described above or below, or as an alternative, further embodiments could include where the calculated instruction counts are determined by computing a ratio of the number of cycles for each different value of the group size to a total number of cycles per instruction and applying the ratio for each different value of the group size to the weighted instruction count per instruction. An advantage includes rescaling results to normalize results for comparison to alternate processing system implementations.

In addition to one or more of the features described above or below, or as an alternative, further embodiments could include computing an execution ratio for the sequence of the instructions based on monitoring for additional events that include the instruction grouping information. An advantage includes computing additional profiling statistics for additional events.

According to a further aspect, a method for performance profiling of an application in a computer system is provided that includes executing, by a processor of the computer system, an instruction stream of the application including a plurality of instructions that is dynamically grouped at run-time. The processor monitors for an event associated with sampled instructions from the instruction stream. A sampled instruction is associated with other events that include instruction grouping information. A number of the instructions in a group that includes the sampled instruction is determined as a group size. The monitored event is tracked as instruction counts with respect to each of the sampled instruction and one or more other instructions of the group. A plurality of subsequent monitored events is tracked as the instruction counts for each of the sampled instruction and one or more other instructions from additional groups of the instructions having various group sizes formed from a basic block of the instructions having a single entry point and a single exit point. An execution count is generated for the basic block of the instructions based on accumulating the instruction counts over a period of time. An advantage includes increased accuracy in the computation of the execution count using instruction counts for a basic block of instructions.

According to an additional aspect, a method for performance profiling of an application in a computer system is provided that includes executing, by a processor of the computer system, an instruction stream of the application including a plurality of instructions that is dynamically grouped at run-time. The processor monitors for an event associated with sampled instructions from the instruction stream. A sampled instruction is associated with other events that include instruction grouping information. A number of the instructions in a group that includes the sampled instruction is determined as a group size based on detecting another event that defines the group size. The monitored event is tracked as a number of cycles with respect to each of the sampled instruction and one or more other instructions of the group. A plurality of subsequent monitored events is tracked as the number of cycles for each of the sampled instruction and one or more other instructions from additional groups of the instructions having various group sizes formed from a basic block of the instructions having a single entry point and a single exit point. An execution count is generated for the basic block of the instructions based on accumulating the number of cycles over a period of time. An advantage includes increased accuracy in the computation of the execution count using a number of cycles for a basic block of instructions.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 10 depicts an example of tracking a number of cycles according to an embodiment;

DETAILED DESCRIPTION

Embodiments described herein are directed to performance profiling of an application in a computer system using grouping events. In order to overcome the problem of reduced accuracy of estimated execution frequency in a processor that groups instructions, embodiments recognize the dynamic nature of instruction grouping at run-time where the same instruction can be grouped into different group configurations having different group sizes across multiple iterations. Embodiments identify the size of a completed group upon a monitored event and infer tracking information with respect to other instructions in a sequence of the instructions to improve accuracy of execution count computations across the sequence of the instructions.

Embodiments can track hardware events that not only provide the number of times that an instruction (and the group in which it was the sampled instruction) was retired (i.e., completed) but also the size of the group. Embodiments can track and infer multiple monitored events for all possible group sizes. For example, if the maximum number instructions that can be retired in single cycle is three, then there can be up to three different instruction monitored events for each instruction collected over a period of time, where a given instruction completes in a group size of one, two, or three. Group-retire information can be associated with a monitored event to track a group size with respect to an identified instruction, and the monitored event can be mapped to one or more other instructions in the group that were not directly identified when the monitored event was sampled. Thus, each instruction can have a completion counter value inferred from all of the instructions that were sampled and were executed dynamically in the same group. For instance, a sampled instruction that completes with a group size of three implies that the next two instructions following the sampled instruction should also be tracked as completed even though a monitored event was not directly observed for the next two instructions. This results in more uniform and accurate counts for all of the instruction executed in a given sequence of the instructions, such as a basic block of instructions. Once counts have been determined by direct observation and inference for instructions in a basic block of instructions, an execution count for the entire basic block of instructions can be generated, for example, by averaging the counts of all observed and inferred instructions in the basic block.

Figure 1:
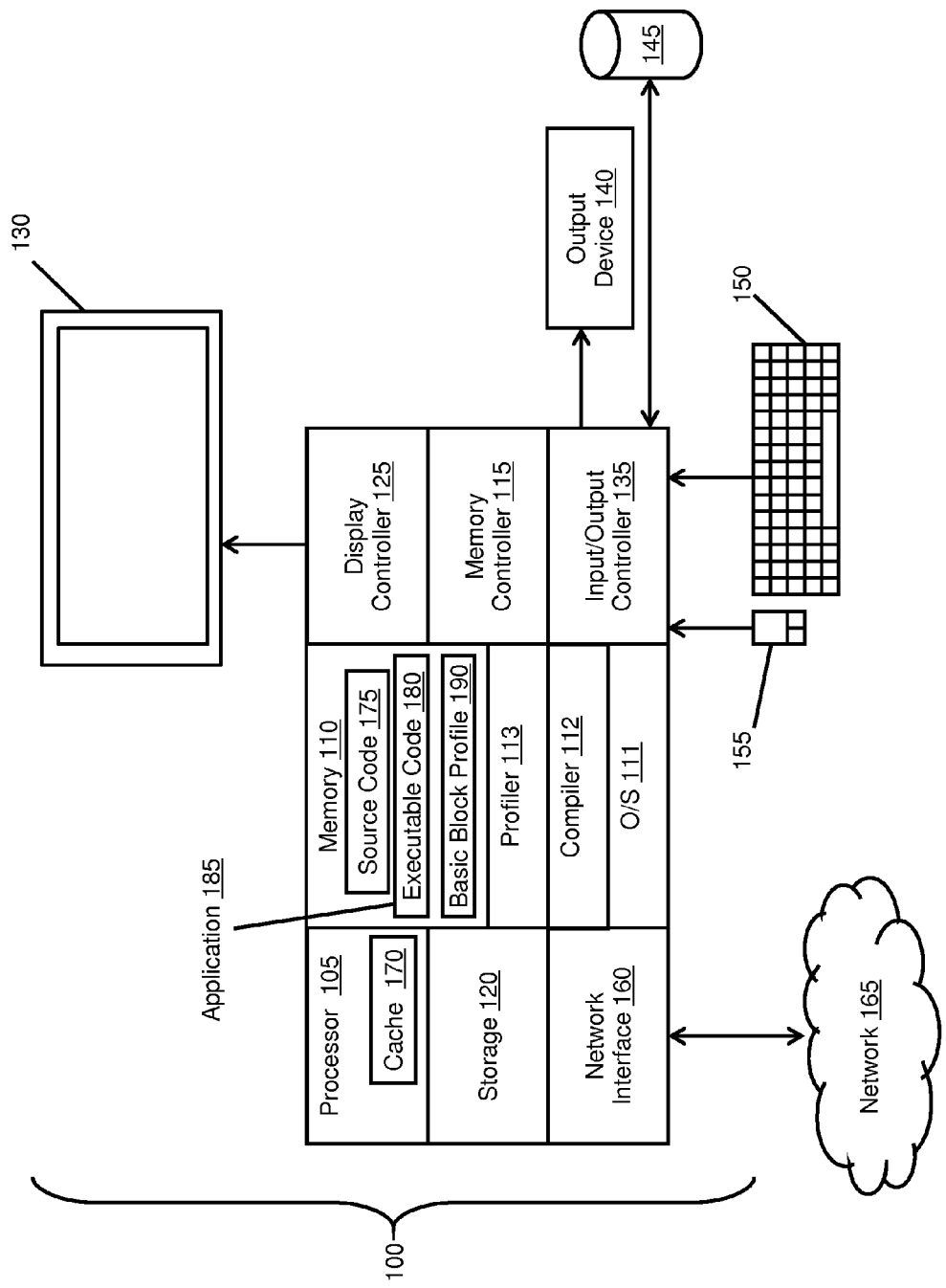
FIG. 1 depicts a block diagram of a computer system according to an embodiment.

FIG. 1 illustrates a block diagram of a computer system 100 for use in performance profiling according to some embodiments. The systems and methods described herein may be implemented in hardware, software (e.g., firmware), or a combination thereof. In some embodiments, the methods described may be implemented, at least in part, in hardware and may be part of the microprocessor of a computer system 100, such as a personal computer, workstation, minicomputer, tablet computer, mobile device, server, or mainframe computer. The computer system 100 is also referred to as processing system 100 (or system 100) and can be equipped with additional software and hardware to support software development and execution for a variety of target systems.

In some embodiments, as shown in FIG. 1, the computer system 100 includes a processor 105, physical memory 110 coupled to a memory controller 115, and one or more input/output devices 145 and/or output devices 140, such as peripherals, that are communicatively coupled power via a local I/O controller 135. These devices 140 and 145 may include, for example, a printer, a scanner, a microphone, and the like. Input devices such as a conventional keyboard 150 and mouse 155 may be coupled to the I/O controller 135. The I/O controller 135 may be, for example, one or more buses or other wired or wireless connections, as are known in the art. The I/O controller 135 may have additional elements, which are omitted for simplicity, such as controllers, buffers (caches), drivers, repeaters, and receivers, to enable communications.

The I/O devices 140, 145 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 105 is a hardware device for executing hardware instructions or software, particularly those stored in the physical memory 110. The processor in 105 may include multiple CPUs. The processor 105 may be a custom made or commercially available processor, a central processing unit (CPU), an auxiliary processor among several processors associated with the computer system 100, a semiconductor based microprocessor (in the form of a microchip or chip set), a macroprocessor, or other device for executing instructions. The processor 105 includes a cache 170, which may include, but is not limited to, an instruction cache to speed up executable instruction fetches and a data cache to speed up data loads and stores. The cache 170 may be organized as a hierarchy of more cache levels (L1, L2, etc.).

The memory 110 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, or other types of storage media. Note that the memory 110 may have a distributed architecture, where various components are situated remote from one another but may be accessed by the processor 105.

The instructions in memory 110 may include one or more separate programs, each of which comprises an ordered listing of executable instructions for implementing logical functions, as well as files and data structures. In the example of FIG. 1, the instructions in the memory 110 include a suitable operating system (OS) 111. The operating system 111 essentially may control the execution of other computer programs and provides scheduling, input-output control, file and data management, memory management, power management, and communication control and related services.

Additional data, including, for example, instructions for the processor 105 or other retrievable information, may be stored in storage 120, which may be a local storage device such as a hard disk drive or solid state drive.

The computer system 100 may further include a display controller 125 coupled to a display 130. In some embodiments, the computer system 100 may further include a network interface 160 for coupling to a network 165.

Systems and methods according to this disclosure may be embodied, in whole or in part, in computer program products or in computer systems 100, such as that illustrated in FIG. 1. For example, a compiler 112 and/or profiler 113 can include a portion of the functionality according to the methods described herein for performance profiling by compiling source code 175, generating executable code 180 of an application 185 and generating a basic block profile 190 of the application 185. For instance, the profiler 113 can generate the basic block profile 190 of one or more sequences of instructions identified in the application 185 using hardware features of the processor 105 or another target processor. The basic block profile 190 can identify one or more instances of a basic block average instruction count for a basic block of instructions, which can then be used during an optimization process by the compiler 112 or other code optimization tool to recompile the source code 175 or reoptimize the executable code with an alternate arrangement of the executable code 180 to seek performance improvements, e.g., a reduction in cycle execution counts. The compiler 112 and the profiler 113 may be comprised of program instructions executable by the processor 105. The compiler 112 and profiler 113 can be stored in a computer readable storage medium such as the memory 110 and/or storage 120. Similarly, the source code 175, executable code 180, and basic block profile 190 can be stored in a computer readable storage medium such as the memory 110 and/or storage 120. The source code 175 may be received over the network 165, and the executable code 180 can be transmitted over the network 165 for distribution to a targeted system that is separate from the computer system 100. Although only a single basic block profile 190 is depicted in FIG. 1, it will be understood that the application 185 can have many basic block profiles for multiple sequences of instructions that are identified as basic blocks of instructions. The compiler 112 is one example of an optimizer, and it will be understood that the optimization can also or alternatively be implemented in a binary-level optimizer and can be performed dynamically during application run-time or prior to application execution.

Figure 2:
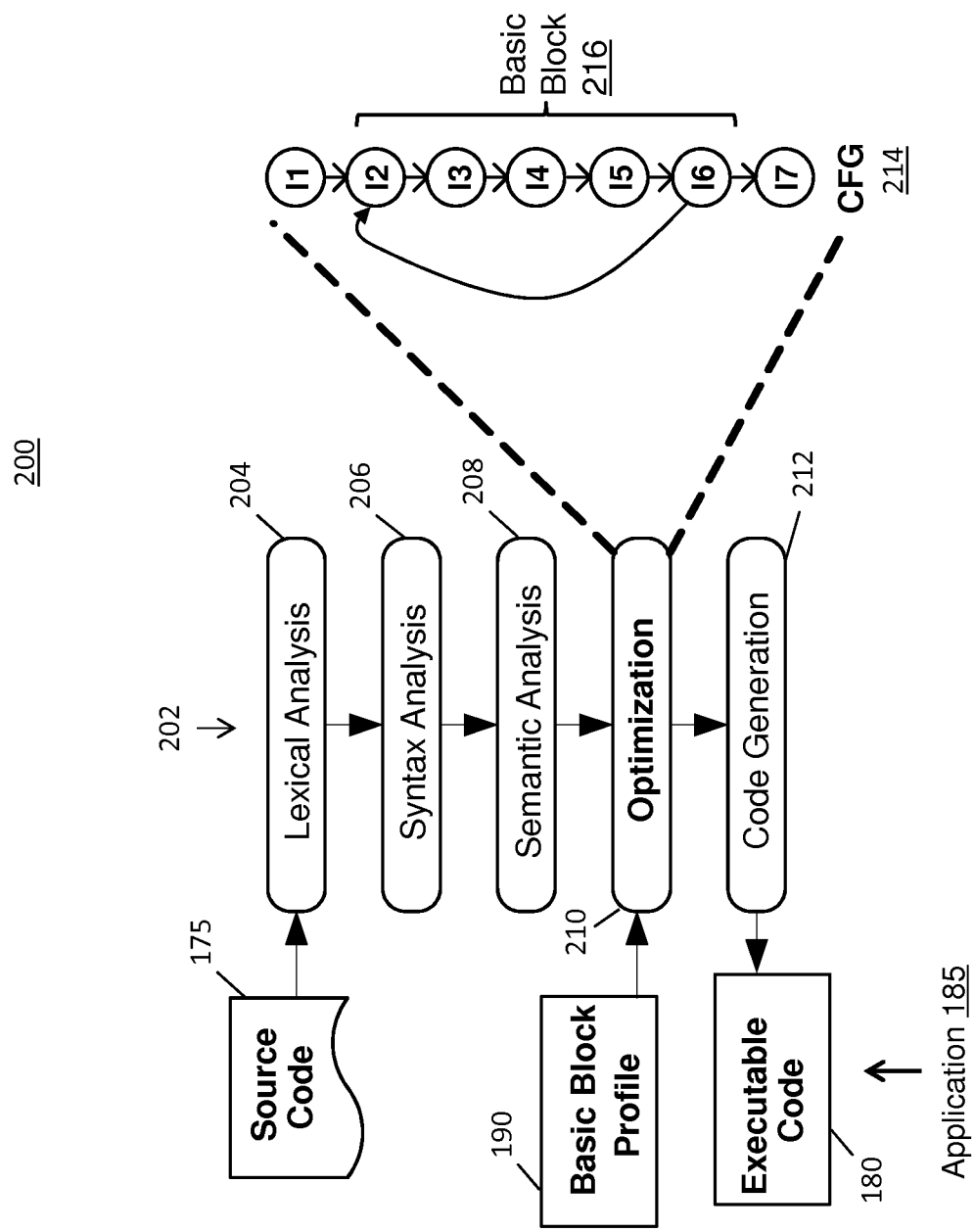
FIG. 2 depicts stages of compiling source code of an application according to an embodiment.

FIG. 2 illustrates stages 202 of compiling the source code 175 of application 185 into executable code 180 in accordance with an embodiment in software development process 200. As one example, compiler 112 of FIG. 1 can perform a lexical analysis stage 204 on source code 175 followed by a syntax analysis stage 206, a semantic analysis stage 208, an optimization stage 210, and a code generation stage 212 to produce executable code 180 for application 185 (which may be formatted as object code prior to linking). As part of the analysis actions in stages 204-208, the compiler 112 can produce a control flow graph (CFG) 214 using techniques known in the art. The CFG 214 identifies a sequence of the instructions (1147 in this example) of the application 185. In CFG 214, instruction I1 flows to I2, I2 flows to I3, I3 flows to I4, I4 flows to I5, I5 flows to I6, I6 flows to I7 or back to I2. A basic block 216 can be identified relative to CFG 214 as including instructions I2, I3, I4, I5 and I6 since this sequence of the instructions has a single entry point (in I2 from I1 and I6) and a single exit point (from I6 to I2 and I7, as a single branch that can target multiple locations). The optimization stage 210 can include logic to identify the basic block 216 for the profiler 113 of FIG. 1 and to subsequently optimize the CFG 214 based on the basic block profile 190 generated by the profiler 113. Embodiments improve the accuracy of information included within the basic block profile 190, and upon receiving the basic block profile 190, the optimization stage 210 can apply known optimization techniques to modify performance of the executable code 180, e.g., using feedback-directed optimization.

Figure 3:
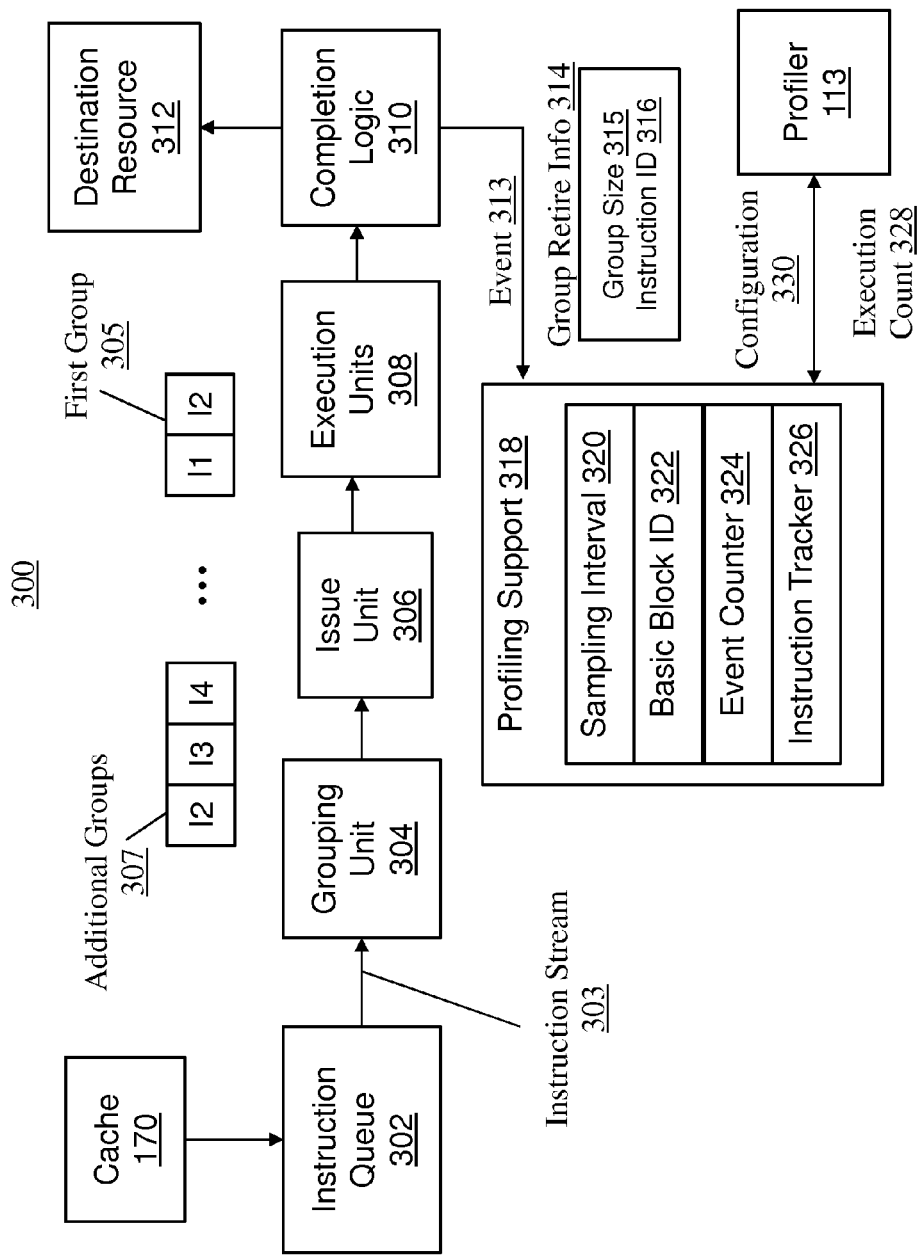
FIG. 3 depicts a block diagram of a processing pipeline according to an embodiment.

Referring now to FIG. 3, a block diagram of a processing pipeline 300 in accordance with an embodiment is shown. As illustrated, the processing pipeline 300 is part of a processing system and may be embodied within the processor 105 of FIG. 1. The processing pipeline 300 can include an instruction queue 302, a grouping unit 304, an issue unit 306, execution units 308, completion logic 310, and other elements known in the art. In the example of FIG. 3, the instruction queue 302 buffers a sequence of the instructions (e.g., executable code 180 of application 185 of FIG. 1) from cache 170 and provides an instruction stream 303 to grouping unit 304. The grouping unit 304 can group multiple instructions from the instruction stream 303 together which are issued as a group of instructions by the issue unit 306 to execution units 308. For example, during a first iteration of a sequence of the instructions, the instructions I1 and I2 may be grouped together in a group 305 and in later iterations (e.g., during a loop) the instructions I2, I3, and I4 may be grouped in additional groups of instructions 307. The execution units 308 can include multiple arithmetic logic units that enable fixed-point math and floating-point math operations to be performed in parallel. As a further example, instruction groups can include one, two, or three (for example, but not limited to, as it can also include more instructions) instructions that complete simultaneously, where the completion logic 310 writes results to destination resource 312 and triggers a monitored event 313 upon completion. A maximum group size of each group of instructions formed by the grouping unit 304 can be constrained by the issue unit 306 and/or execution units 308, as well as grouping rules that may limit groups based on instruction type and/or dependence on execution results. The destination resource 312 may be any type of resource, including registers, cache memory, other memory, I/O circuitry to communicate with other devices, other processing circuits, or any other type of destination for executed instructions or data.

The completion logic 310 can provide the monitored event 313 and group-retire information 314, which may include a group size 315 and an instruction identifier 316, to profiling support 318. The monitored event 313 can be a cycle event, an instruction completion event, and/or other hardware events. The group size 315 indicates a number of instructions that were completed as part of a same group of instructions, and the instruction identifier 316 can be an address (e.g., from a program counter) of the first (earliest) or last (latest) instruction sampled in the group. The identity of one or more other instructions in the group can be inferred based on the group size 315 and a position of the sampled instruction with respect to a sequence of the instructions in the instruction stream 303. For example, with respect to the group 305, the profiling support 318 can identify instruction I1 as a sampled instruction based on the instruction identifier 316 indicating an address associated with instruction I1. The profiling support 318 can infer that the group 305 also includes instruction I2 based on a group size 315 of two if it is also known that instruction I2 follows instruction I1. Similarly, profiling support 318 can infer that additional groups of instructions 307 include instructions I3 and I4 based on a group size 315 of three and an instruction identifier 316 indicating an address associated with instruction I2.

The profiling support 318 can include a configurable sampling interval 320 that establishes a periodic sampling rate to monitor for each monitored event 313. For instance, the sampling interval 320 can establish a minimum time or number of instructions between observations of the monitored event 313 and corresponding group-retire information 314 to reduce an associated overhead burden of profiling with respect to execution of application 185 of FIGS. 1 and 2. The profiling support 318 can also include one or more basic block identifier 322 that identify one or more sequences of instructions as basic blocks to be profiled to populate the basic block profile 190 of FIGS. 1 and 2. Each basic block identifier 322 can include a range of address values that are known to include a basic block of instructions, such as basic block 216 of FIG. 2, for instance as identified from CFG 214 of FIG. 2. When profiling is performed on basic blocks, the one or more instructions that are not directly identified in a group of instructions can be inferred since there is no branching within the basic blocks.

The profiling support 318 can also include an event counter 324 that may accumulate instances of the monitored event 313 that occurred with at least one instruction in a basic block of instructions, e.g., as identified/inferred using one or more basic block identifier 322 and the group-retire information 314. The event counter 324 may support tracking by an instruction tracker 326 with respect to instruction counts and/or a number of cycles. Embodiments that support instruction count based tracking are further described with respect to FIGS. 5-8, and embodiments that support tracking based on a number of cycles are further described with respect to FIGS. 9-12.

In embodiments, profiling support 318 generates an execution count 328 for a sequence of the instructions, e.g., basic block 216 of FIG. 2, based on accumulating separate events over a period of time, where the separate events can be instances of the monitored event 313 that have identified and one or more other instructions that are within a targeted tracking range (e.g., members of a basic block of instructions as identified in one or more basic block identifier 322). The execution count 328 may be an average value computed across group sizes and instructions within a basic block of instructions. The execution count 328 can be provided to profiler 113, which may in turn summarize and report results for multiple basic blocks of instructions from application 185 in basic block profile 190 of FIGS. 1 and 2. The profiler 113 can also establish a configuration 330 of the profiling support 318 to set the sampling interval 320 and one or more basic block identifiers 322, as well as reset the event counter 324 and instruction tracker 326. While only one instance of profiling support 318 is depicted in FIG. 3, it will be understood that multiple instances of the profiling support 318 and/or elements of the profiling support 318 can be implemented in parallel to track multiple basic blocks of instructions in parallel during run-time of the application 185 of FIGS. 1 and 2. The profiling support 318 can be implemented within the processor 105 of FIG. 1 as a combination of hardware and software/firmware. For example, the profiling support 318 can be embodied in computer readable instructions and/or program instructions that are executable by processor 105 of FIG. 1 and may leverage various facilities of the processor 105 to capture hardware events and associated data.

Figure 4:
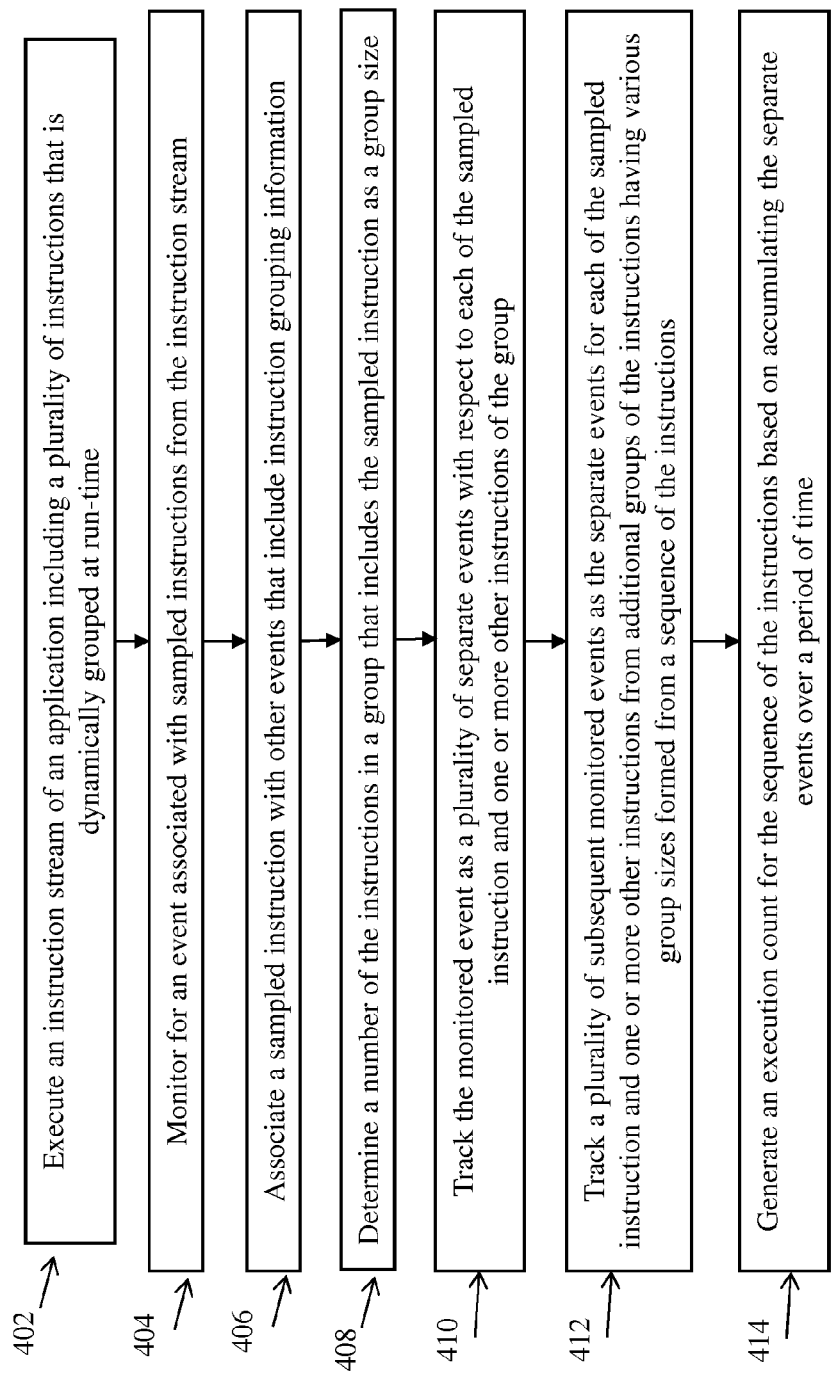
FIG. 4 depicts a process flow for performance profiling of an application in a computer system according to an embodiment.

Referring to FIG. 4, a process flow 400 for performance profiling of an application in a computer system, such as application 185 in computer system 100, is generally shown in accordance with an embodiment. In an embodiment, the process flow 400 shown in FIG. 4 can be performed in the processing pipeline 300 of FIG. 3, for instance as part of processor 105 of FIG. 1. The process flow 400 is further described with respect to FIGS. 1-3. At block 402, processor 105 executes instruction stream 303 of the application 185 that includes a plurality of instructions that is dynamically grouped (e.g., groups 305, 307) at run-time by grouping unit 304.

At block 404, profiling support 318 of processor 105 monitors for a monitored event 313 associated with sampled instructions of the instruction stream 303. Monitoring for the monitored event 313 can be performed periodically based on a sampling interval 320 to sample instructions, e.g., one instruction in a group of instructions. At block 406, profiling support 318 of processor 105 associates a sampled instruction (e.g., instruction I1) with other events that include instruction grouping information. For instance, instruction group formation, completion events, and/or cycle count events can be events that identify instruction grouping information, such as instruction identifier 316 and group size 315. At block 408, profiling support 318 of processor 105 determines a number of instructions in the group 305 that includes the sampled instruction as a group size 315 using, for instance, group-retire information 314.

At block 410, profiling support 318 of processor 105 tracks the monitored event 313 as a plurality of separate events with respect to each of the sampled instruction and one or more other instructions of the group. Various counters can be observed upon sampling to derive various profiling statistics. At block 412, profiling support 318 of processor 105 tracks a plurality of subsequent monitored events 313 as the separate events for each of the sampled instruction and one or more other instructions from additional groups 307 of the instructions having various group sizes formed from the sequence of the instructions. The sequence of the instructions can include a basic block 216 of instructions that includes a greater number of instructions than the group size 315 in some embodiments. For example, a basic block of instructions may include ten instructions, and the group size 315 may be limited to four instructions.

At block 414, profiling support 318 of processor 105 generates an execution count 328 for the sequence of the instructions based on accumulating the separate events over a period of time. The profiler 113 may use the execution count 328 and other information (e.g., CFG 214, basic block 216, source code 175, and/or executable code 180) to infer an identity of one or more other instructions in each group based on the group size 315 and a position of the sampled instruction with respect to a sequence of the instructions in the instruction stream 303, e.g., instruction I2 follows I1.

The separate events can be tracked as instruction counts for each different value of the group size 315 (e.g., one, two, or three instructions per group), and the execution count 328 may be based on a summation of the instruction counts for each different value of the group size 315 on an instruction basis and computed (e.g., averaged) across the sequence of the instructions. Alternatively, the separate events are tracked as a number of cycles for each different value of the group size 315, a weighted instruction count per instruction can be computed on a group size basis, a plurality of calculated instruction counts can be determined based on the weighted instruction count per instruction and the number of cycles for each different value of the group size 315, and the execution count 328 may be based on a summation of the calculated instruction counts for each different value of the group size 315 on an instruction basis and computed (e.g., averaged) across the sequence of the instructions. The calculated instruction counts may be determined by computing a ratio of the number of cycles for each different value of the group size 315 to a total number of cycles per instruction and applying the ratio for each different value of the group size 315 to the weighted instruction count per instruction. Further, an execution ratio for the sequence of the instructions can be computed based on monitoring for additional events that include the instruction grouping information. These techniques are further described herein.

Figure 5:
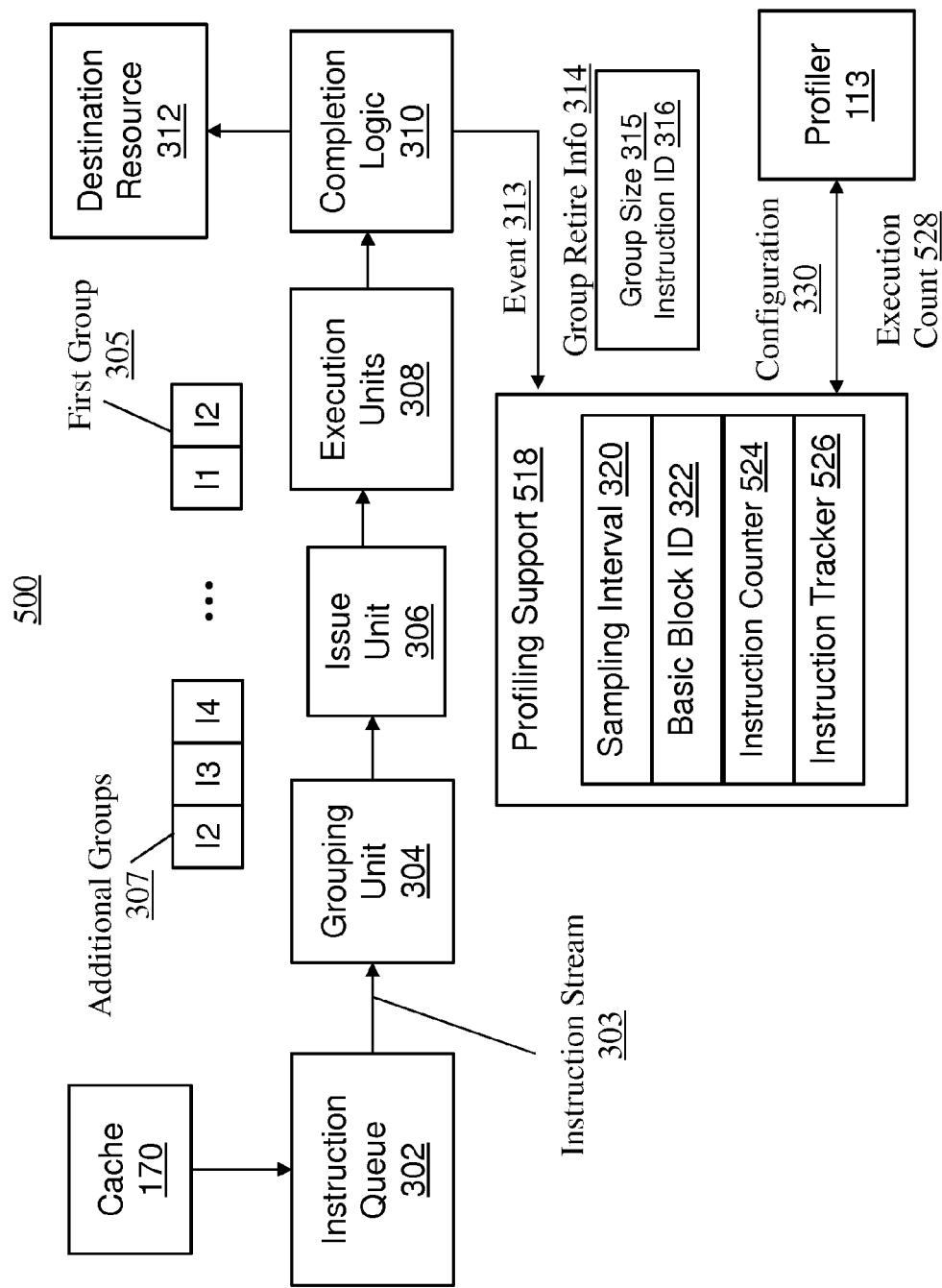
FIG. 5 depicts a block diagram of a processing pipeline according to an embodiment.

FIG. 5 depicts a block diagram of a processing pipeline 500 according to an embodiment. Similar to the processing pipeline 300 of FIG. 3, the processing pipeline 500 may be embodied within the processor 105 of FIG. 1 and can include instruction queue 302, grouping unit 304, issue unit 306, execution units 308, completion logic 310, and other elements known in the art. As previously described with respect to FIG. 3, the instruction queue 302 buffers a sequence of the instructions from cache 170 and provides an instruction stream 303 to grouping unit 304. The completion logic 310 can provide the monitored event 313 and group-retire information 314, which may include a group size 315 and an instruction identifier 316, to profiling support 518. The monitored event 313 can be a cycle event, an instruction completion event, and/or other hardware events. Similar to profiling support 318 of FIG. 3, the profiling support 518 can include sampling interval 320 and one or more basic block identifiers 322. Rather than a general event counter, the profiling support 518 includes an instruction counter 524 that supports support tracking by an instruction tracker 526 to generate an execution count 528.

The instruction counter 524 can count instructions as a sampled event count of the number of times an instruction "X" was sampled as retired/completed when it was the sampled instruction of a group of size "n", which can be generally expressed as "ICn(X)". A maximum value of group size 315 can be expressed as "p". In order to calculate a count of an instruction "C(X)", it can be seen that the number of times instructions were sampled as a group of size "n" in the same group of "X" that these samples effectively also include the retire/complete of instruction "X". Thus, a value of "Cn(X)" can be computed as a sum from "j"=0 to "n"−1 of values of "ICn(X−j)", and "C(X)" equals a sum from "j"=1 to "p" of "Cj(X)". In other words, the number of times that an instruction was actually retired/completed (as indicated by the sampling) is the number of times it was retired in any group that included the instruction.

Figures 6, 7:
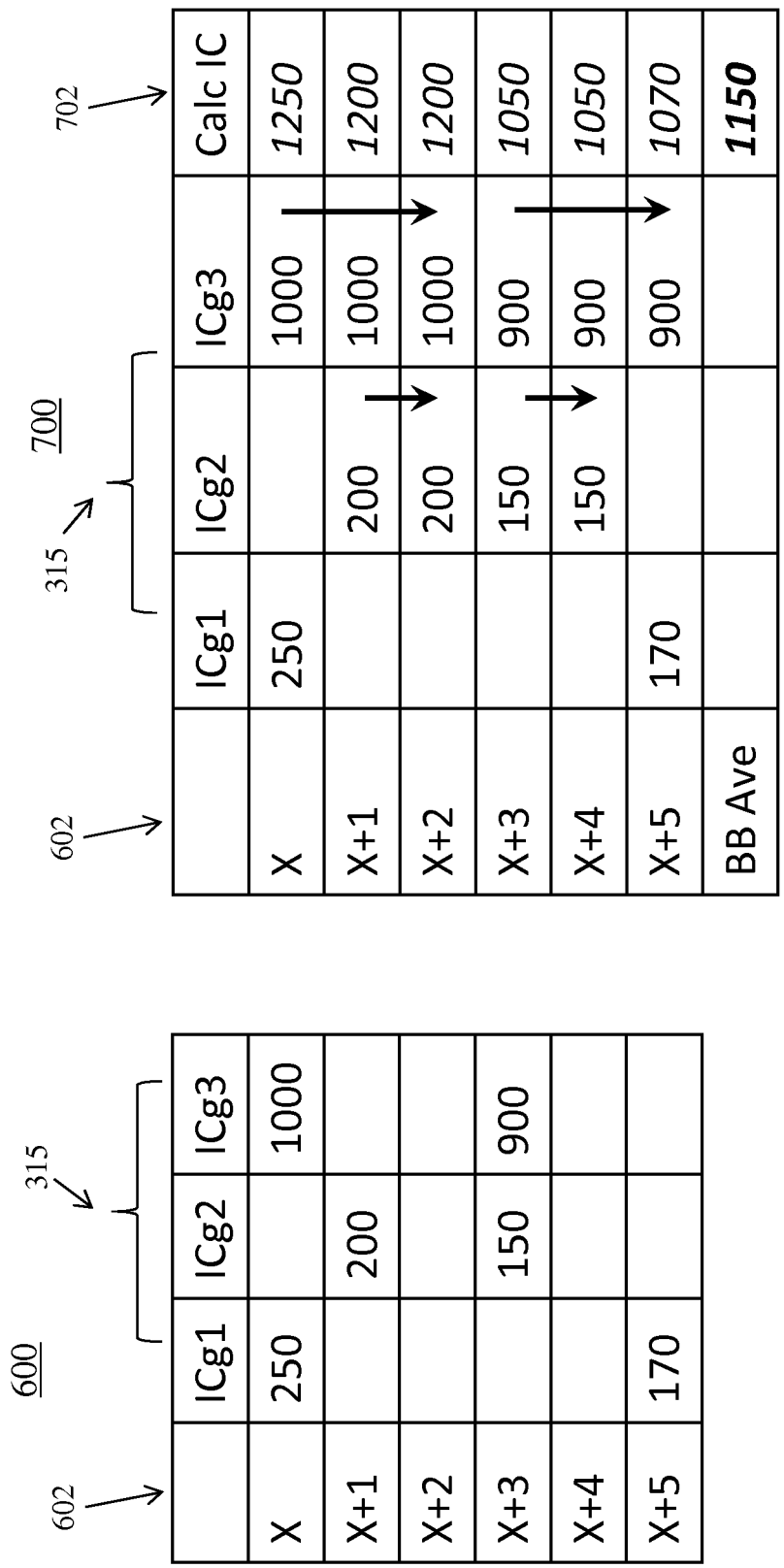
FIG. 6 depicts an example of tracking instruction counts according to an embodiment.
FIG. 7 depicts an example of generating an execution count for a basic block based on accumulating instruction counts over a period of time according to an embodiment.

Consider the following example when groups have a maximum size of three, and where the "IC" counts are actually the number of groups retired/completed. FIG. 6 is an example of sampling with a specific value of the group size 315 for a given basic block 602 that includes six instructions: X, X+1, X+2, X+3, X+4, and X+5. ICg1 indicates a count of samples where the group size 315 was one. ICg2 indicates a count of samples where the group size 315 was two (i.e., two neighboring instructions grouped together). ICg3 indicates a count of samples where the group size 315 was three (i.e., three neighboring instructions grouped together). As indicated in table 600 of FIG. 6, most often basic block 602 was executed as two groups of three instructions (ICg3=1000 for X and 900 for X+3), and other times basic block 602 was executed as two groups of one instruction (ICg1=250 for X and 170 for X+5) and as two groups of two instructions (ICg2=200 for X+1 and 150 for X+3). Using prior art approaches to computing a basic block average execution without the association of instruction complete also to the group size would result in concluding that instruction X executed 1250 times (i.e., ICg1 of 250+ ICg3 of 1000), instruction X+1 executed 200 times (i.e., ICg2 of 200), instruction X+3 executed 1050 times (i.e., ICg2 of 150+ICg3 of 900), and instruction X+5 executed 170 times (i.e., ICg1 of 170), resulting in an average execution count of about 668 for the basic block 602.

FIG. 7 illustrates how the instruction tracker 526 of profiling support 518 of FIG. 5 maps values of the instruction counter 524 to all of the instructions in the basic block 602 and calculates an actual instruction count of each instruction, as well as the basic block average as execution count 528 based on the instruction count of all instructions. As depicted in table 700 of FIG. 7, the values as collected in table 600 of FIG. 6 are spread according to the instruction group size. Since ICg2 values are associated with two instructions per group, values of ICg2 are spread to the next sequential instruction as inferred values (e.g., X+2 gets a value of ICg2=200 based on X+1, and X+4 gets a value of ICg2=150 based on X+3). Similarly, ICg3 values are spread to the two subsequent instructions following a recorded value of ICg3 as inferred values (e.g., X+1 and X+2 get a value of ICg3=1000 from X, and X+4 and X+5 get a value of ICg3=900 from X+3). Values of calculated instruction counts 702 can be determined as a summation of the instruction counts for each different value of the group size 315 on an instruction basis (e.g., calculated instruction count of X is 250+1000=1250). The column of calculated instruction counts 702 is averaged across the basic block 602 as a sequence of the instructions, resulting in a basic block average of about 1150 in table 700. Thus, it can be seen that taking the average without taking into account the dynamic changes in group size 315 provides lower calculated average count for the basic block 602, and the profiling support 518 of FIG. 5 therefore improves calculation accuracy.

Figure 8:
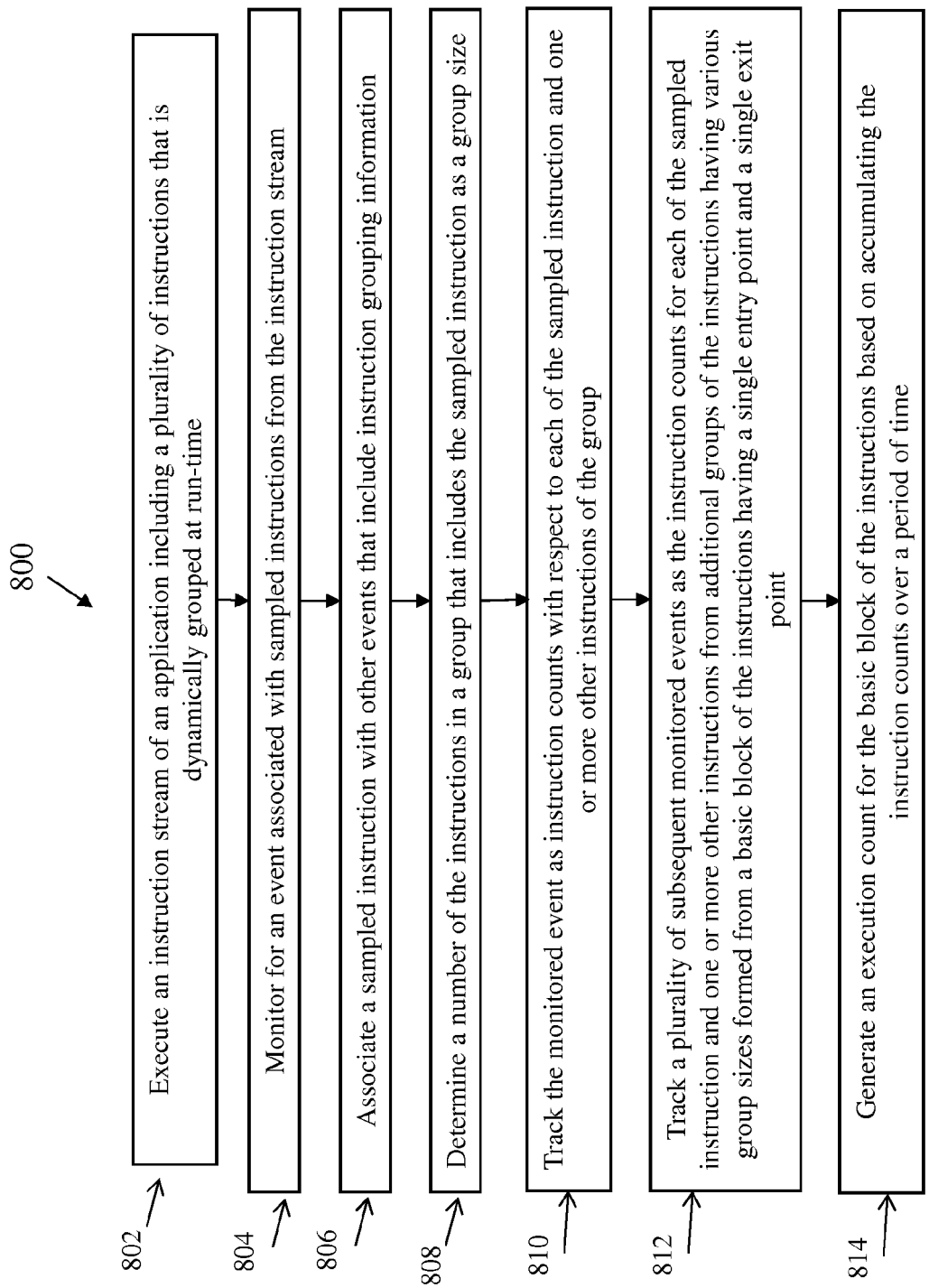
FIG. 8 depicts a process flow for performance profiling of an application in a computer system according to an embodiment.

Referring to FIG. 8, a process flow 800 for performance profiling of an application in a computer system, e.g., application 185 of computer system 100 of FIG. 1, is generally shown in accordance with an embodiment. In an embodiment, the process flow 800 shown in FIG. 8 can be performed using the processing pipeline 500 of FIG. 5, for instance as part of processor 105 of FIG. 1. The process flow 800 is further described with respect to FIGS. 1-7. At block 802, processor 105 executes an instruction stream 303 of the application 185 including a plurality of instructions that are dynamically grouped (e.g., groups 305, 307) at run-time by grouping unit 304.

At block 804, profiling support 518 of processor 105 monitors for a monitored event 313 associated with sampled instructions from the instruction stream 303. Monitoring for the monitored event 313 can be performed periodically based on a sampling interval 320 to sample instructions, e.g., one instruction in a group of instructions. At block 806, profiling support 518 of processor 105 associates a sampled instruction (e.g., instruction I1) with other events that include instruction grouping information. For instance, instruction completion events can be events that identify instruction grouping information, such as instruction identifier 316 and group size 315. At block 808, profiling support 518 of processor 105 determines a number of instructions in the group 305 that includes the sampled instruction as a group size 315 using, for instance, group-retire information 314.

At block 810, profiling support 518 of processor 105 tracks the monitored event 313 as instruction counts using instruction counter 524 with respect to each of the sampled instruction and the one or more other instructions of the group as depicted in the example of FIG. 7. At block 812, profiling support 518 of processor 105 tracks a plurality of subsequent monitored events as the instruction counts for each of the sampled instruction and one or more other instructions from additional groups of the instructions 307 having various group sizes formed from the basic block 602 of instructions as depicted in FIG. 7. The basic block of instructions can have a single entry point and a single exit point, such as basic block 602. The basic block of instructions can include a greater number of instructions than the group size 315 supported (e.g., six instructions in basic block 602 with a group size of three). At block 814, profiling support 518 of processor 105 generates an execution count 528 for the basic block 602 of instructions based on accumulating the instruction counts over a period of time. The instruction counts can be tracked for each different value of the group size 315 (e.g., in columns ICg1, ICg2, and ICg3 of table 700), and the execution count 528 is based on a summation of the instruction counts for each different value of the group size 315 on an instruction basis to form calculated instruction counts 702 and averaged across the basic block 602 of instructions as a basic block average. The profiler 113 may use the execution count 528 and other information (e.g., source code 175, and/or executable code 180) to infer an identity of one or more other instructions in each group based on the group size 315 and a position of the sampled instruction with respect to a sequence of the instructions in the instruction stream 303.

Figure 9:
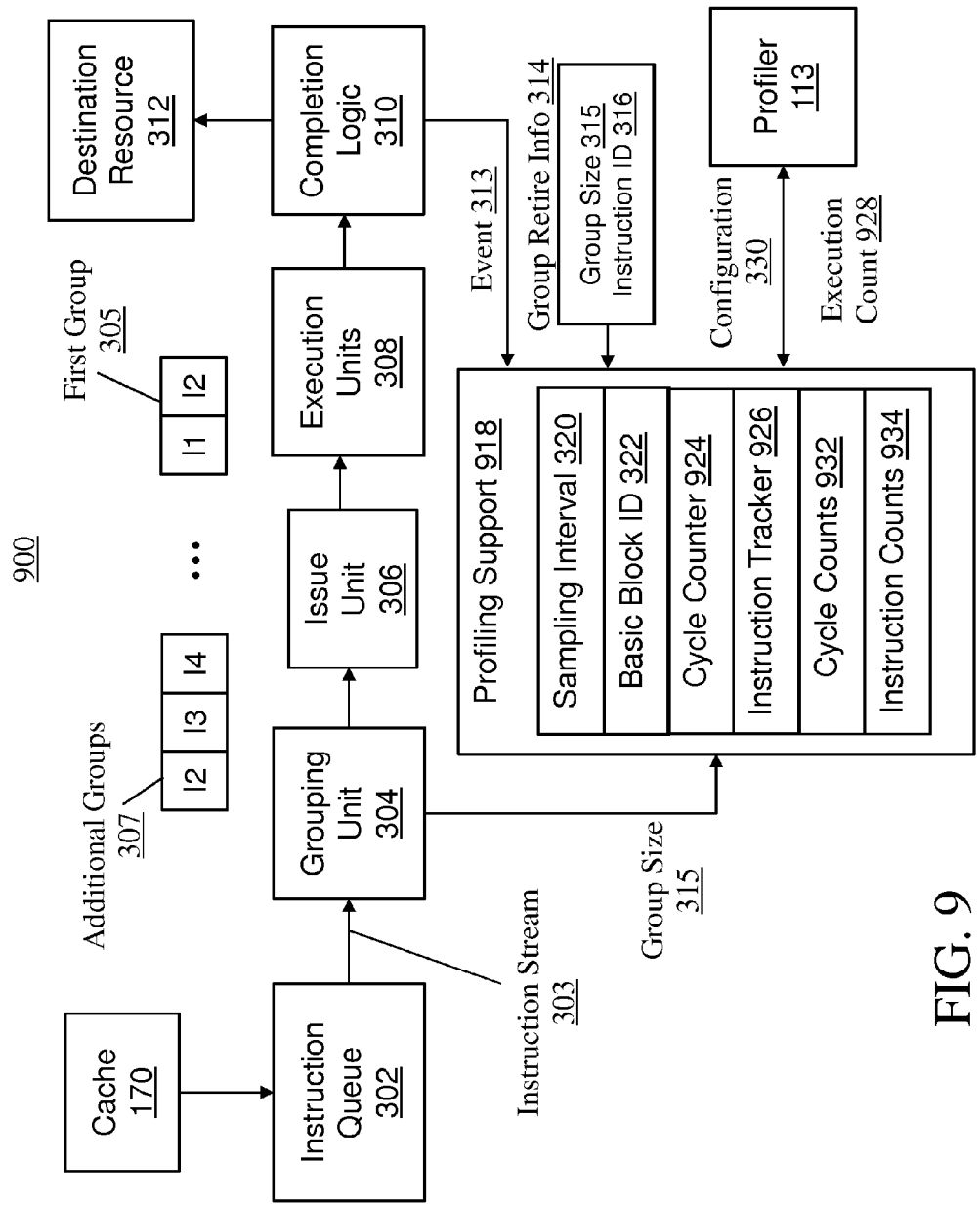
FIG. 9 depicts a block diagram of a processing pipeline according to an embodiment.

FIG. 9 depicts a block diagram of a processing pipeline 900 according to an embodiment. Similar to the processing pipeline 300 of FIG. 3, the processing pipeline 900 may be embodied within the processor 105 of FIG. 1 and can include instruction queue 302, grouping unit 304, issue unit 306, execution units 308, completion logic 310, and other elements known in the art. As previously described with respect to FIG. 3, the instruction queue 302 buffers a sequence of the instructions from cache 170 and provides an instruction stream 303 to grouping unit 304. The completion logic 310 can provide the monitored event 313, which may include an instruction identifier 316, to profiling support 918. The monitored event 313 can be a cycle event, an instruction completion event, and/or other hardware events. In the example of FIG. 9, another event may define group size 315, for instance a group formation event of grouping unit 304, where the group formation event and monitored event 313 are both examples of grouping events. Similar to profiling support 318 of FIG. 3, the profiling support 918 can include sampling interval 320 and one or more basic block identifiers 322. Rather than a general event counter, the profiling support 918 includes a cycle counter 924 that supports support tracking by an instruction tracker 926 to generate an execution count 928.

In the example of FIG. 9, sampling of monitored events 313 can indicate a total number of groups retired while an instruction identified by instruction identifier 316 was first in the group, and the group size 315 is provided by one or more other events. The cycle counts 932 provides a number of cycles based on grouping, that is, the number of cycles sampled using cycle counter 924 while an identified instruction was the sampled instruction of a group of size "n".

Instruction counts 934 can track a total number of retired instruction taking into account the group size 315 (i.e., a group of size three contributes three to the instruction count of the sampled instruction in the group). Therefore, a sum of cycles for group size "i", expressed as "Cgi" for an instruction equals the number of sampled cycles on the instruction. The cycle counts 932 and instruction counts 934 can be used to calculate instruction count values for each instruction and thus an average instruction execution count as execution count 928.

FIG. 10 depicts an example of tracking a number of cycles according to an embodiment. In the example table 1000 of FIG. 10, a basic block 1002 of instructions includes six instructions: X, X+1, X+2, X+3, X+4, and X+5. Cg1 indicates a number of cycles sampled where the group size 315 was one. Cg2 indicates a number of cycles sampled where the group size 315 was two (i.e., two neighboring instructions grouped together). Cg3 indicates a number of cycles sampled where the group size 315 was three (i.e., three neighboring instructions grouped together). As indicated in table 1000 of FIG. 10, most often basic block 1002 was executed as two groups of three instructions (Cg3=3692 for X and 3150 for X+3), and other times basic block 1002 was executed as two groups of one instruction (Cg1=308 for X and 300 for X+5) and as two groups of two instructions (Cg2=500 for X+1 and 350 for X+3). Values of cycle counts 932 represent the summation of Cg1, Cg2, and Cg3 values on an instruction basis across the basic block 1002 and values of instruction counts 934 represent a weighted instruction count per instruction. To normalize the weighting of instruction counts, a ratio of the number of cycles for each different value of the group size 315 to a total number of cycles per instruction is computed, and the ratio for each different value of the group size 315 is applied to the weighted instruction count per instruction as depicted in the example of FIG. 11.

Figure 11:
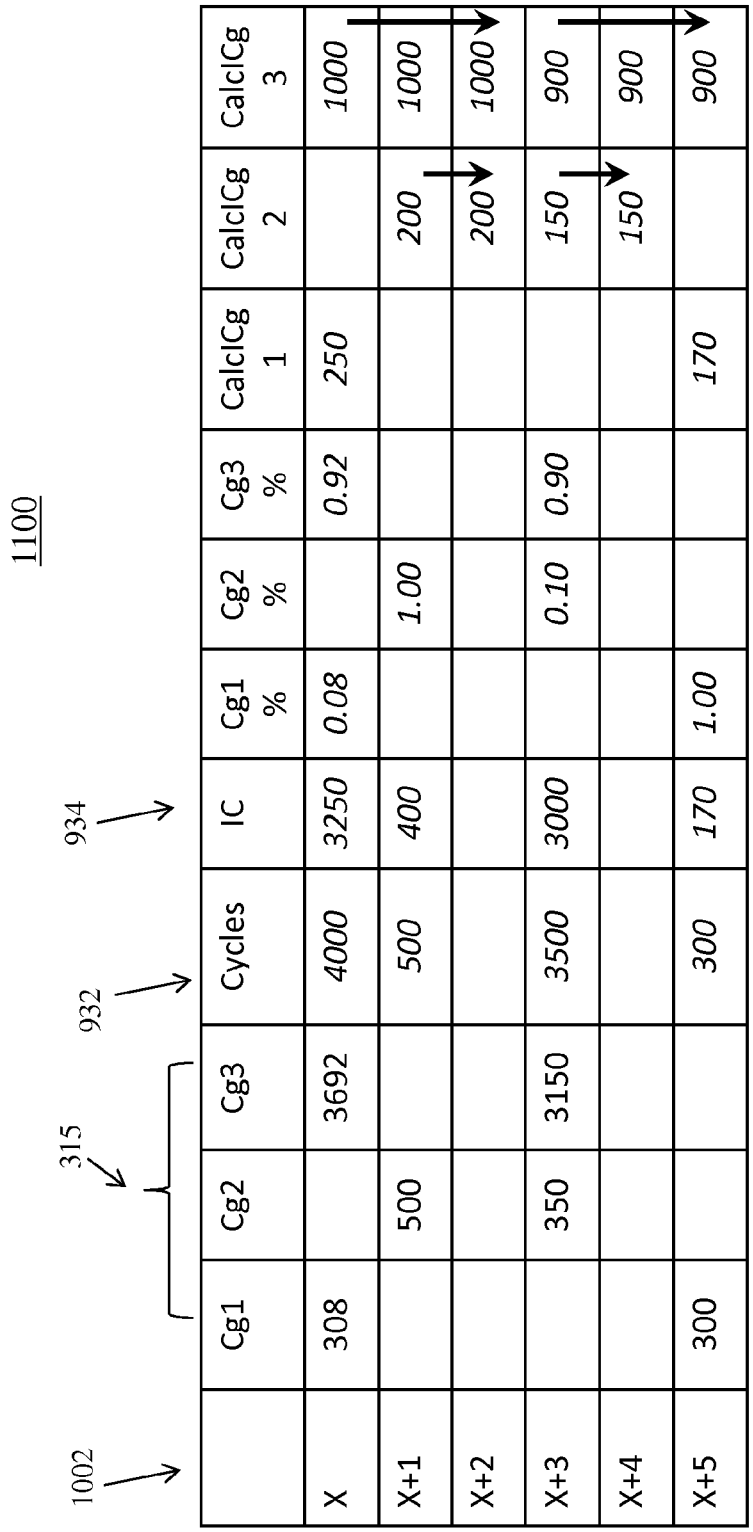
FIG. 11 depicts an example of generating an execution count for a basic block based on accumulating a number of cycles over a period of time according to an embodiment.

In FIG. 11, similar to the example of FIG. 7, the instruction tracker 926 of FIG. 9 maps the Cg1-Cg3 values to instructions in the basic block 1002. As depicted in table 1100 of FIG. 11, the values as collected in table 1000 of FIG. 10 are spread according to calculated instruction counts. Since Cg2 values are associated with two instructions per group, values of Cg2 are spread to the next sequential instruction as inferred values (e.g., X+2 gets a value of Cg2=500 based on X+1, and X+4 gets a value of Cg2=350 based on X+3). Similarly, Cg3 values are spread to the two subsequent instructions following a recorded value of Cg3 as inferred values (e.g., X+1 and X+2 get a value of Cg3=3692 from X, and X+4 and X+5 get a value of Cg3=3150 from X+3).

Ratios can be calculated as each group cycle count value with respect to the total number of cycles, e.g., Cg1/Cycles, Cg2/Cycles, and Cg3/Cycles. A ratio of Cg1% is the calculated ratio of cycles per group for each instruction. For example, in instruction X there are 308 cycles on group1 out of total of 4000 cycles, which results in a ratio value of 0.08. Ratio values are similarly computed for all values Cgi %, where "i" varies from 1 to 3 in this example. Once the Cgi % is computed for each group and each instruction, an instruction count per group can be calculated as CalcICgi for each instruction, where CalcICgi=(Cgi %*IC)/of all the instruction in the group. For example, for instruction X+3 the Cg2 % is 0.1; therefore, both X+3 and X+4 will have a CalcICg2 of 150=(0.1*3000)/2. The CalcICgi values computed in table 1100 can be summarized as a basic block average using the same process as described with respect to FIGS. 5-8, where CalcIGgi is an alternate embodiment of ICgi. The event cycles and ratio used here are an example and other events can be used to compute ratios and calculate correct instruction execution frequency in a similar way.

Figure 12:
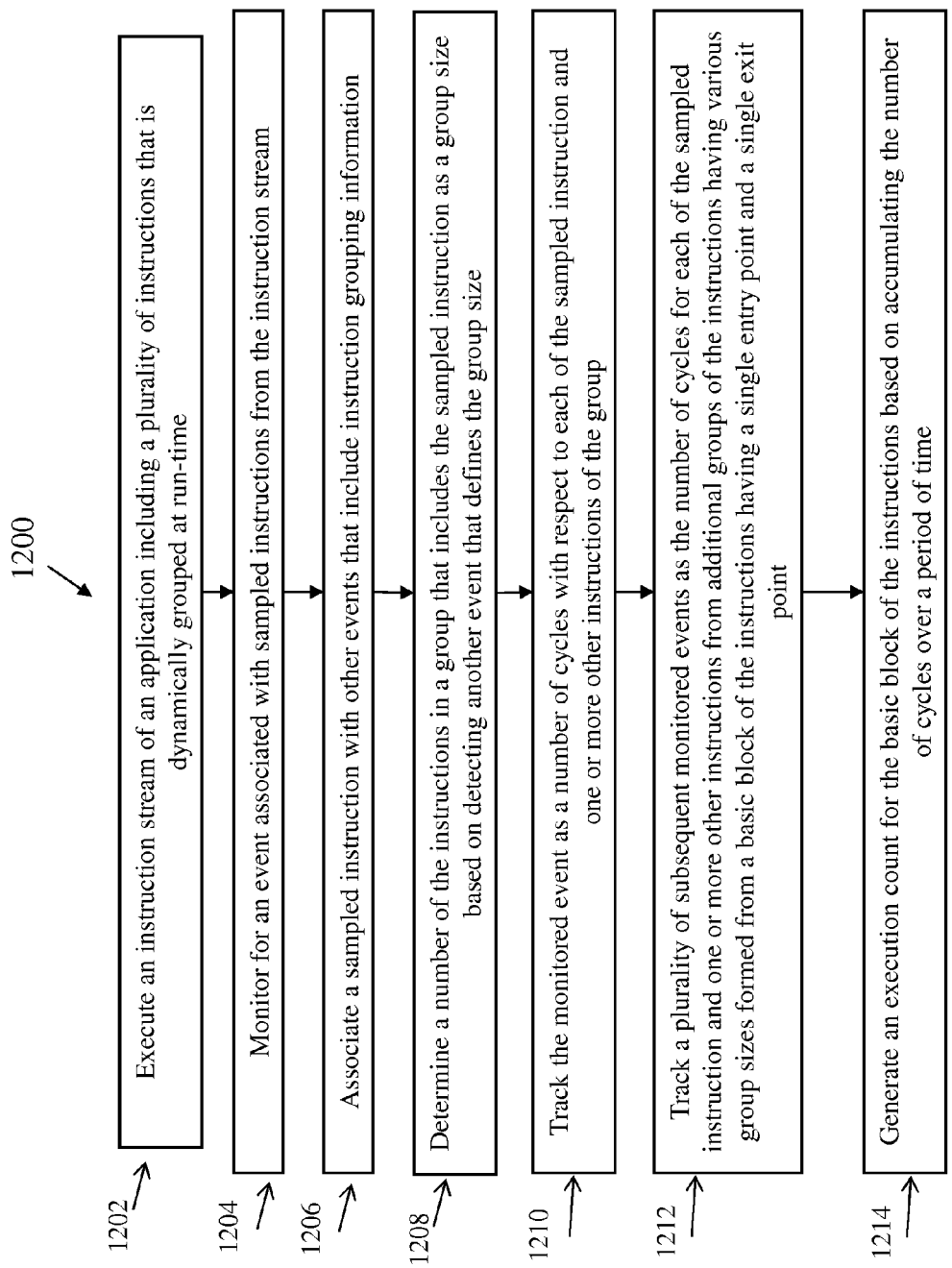
FIG. 12 depicts a process flow for performance profiling of an application in a computer system according to an embodiment.

Referring to FIG. 12, a process flow 1200 for performance profiling of an application in a computer system, e.g., application 185 of computer system 100 of FIG. 1, is generally shown in accordance with an embodiment. In an embodiment, the process flow 1200 shown in FIG. 12 can be performed using the processing pipeline 900 of FIG. 9, for instance as part of processor 105 of FIG. 1. The process flow 1200 is further described with respect to FIGS. 1-11. At block 1202, processor 105 executes an instruction stream 303 of the application 185 including a plurality of instructions that are dynamically grouped (e.g., groups 305, 307) at run-time by grouping unit 304.

At block 1204, profiling support 918 of processor 105 monitors for a monitored event 313 associated with sampled instructions from the instruction stream. At block 1206, profiling support 918 of processor 105 associates a sampled instruction (e.g., instruction I1) with other events that include instruction grouping information. For instance, cycle count events can be events that identify instruction grouping information, such as instruction identifier 316. At block 1208, profiling support 918 of processor 105 determines a number of instructions in the group 305 that includes the sampled instruction as a group size 315 based on detecting another event that defines the group size 315, e.g., a group formation event.

At block 1210, profiling support 918 of processor 105 tracks the monitored event 313 as a number of cycles using cycle counter 924 with respect to each of the sampled instruction and one or more other instructions of the group. At block 1212, profiling support 918 of processor 105 tracks a plurality of subsequent monitored events as the number of cycles for each of the sampled instruction and one or more other instructions from additional groups of the instructions 307 having various group sizes, where the additional groups of instructions can be formed from a basic block of instructions having a single entry point and a single exit point, such as basic block 1002.

At block 1214, profiling support 918 of processor 105 generates an execution count 928 for the basic block 1002 of instructions based on accumulating the number of cycles over a period of time.

Technical effects and benefits include basic block profiling using grouping events to increase profiling accuracy. The grouping events can include monitored events and/or group formation events that provide an indication of a group size and identify at least one instruction in each group. Instruction counts and/or a number of cycles for other instructions that are not directly identified within the groups can be inferred based on group size and instruction sequencing information. By recognizing problems associated with tracking instruction execution in a processor that dynamically groups instructions at run-time, performing instruction tracking on the basis of group size and membership in a basic block of instructions enhances profiling accuracy for the instructions of the basic block.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A system for performance profiling of an application, the system comprising:
    a memory having computer readable instructions; and
    a processor for executing the computer readable instructions, the computer readable instructions comprising:
        executing an instruction stream of the application comprising a plurality of instructions that is dynamically grouped at run-time by a grouping unit that groups multiple instructions from the instruction stream together which are issued as a group of instructions from an issue unit to one or more execution units for simultaneous completion;
        monitoring for an event associated with an instruction from the instruction stream identified as a sampled instruction;
        associating the sampled instruction with other events that include instruction grouping information;
        determining a number of the instructions completed simultaneously in a group that includes the sampled instruction as a group size;
        tracking the monitored event as a plurality of separate events with respect to each of the sampled instruction and one or more other instructions of the group;
        tracking a plurality of subsequent monitored events as the separate events for each of the sampled instruction and one or more other instructions from additional groups of the instructions having various group sizes formed from a sequence of the instructions; and
        generating an execution count for the sequence of the instructions based on accumulating the separate events over a period of time.

2. The system of claim 1, wherein the monitoring is performed periodically based on a sampling interval.

3. The system of claim 1, wherein the separate events are tracked as instruction counts for each different value of the group size, and the execution count is based on a summation of the instruction counts for each different value of the group size on an instruction basis and computed across the sequence of the instructions.

4. The system of claim 1, wherein the separate events are tracked as a number of cycles for each different value of the group size, a weighted instruction count per instruction is computed on a group size basis, a plurality of calculated instruction counts is determined based on the weighted instruction count per instruction and the number of cycles for each different value of the group size, and the execution count is based on a summation of the calculated instruction counts for each different value of the group size on an instruction basis and computed across the sequence of the instructions.

5. The system of claim 4, wherein the calculated instruction counts are determined by computing a ratio of the number of cycles for each different value of the group size to a total number of cycles per instruction and applying the ratio for each different value of the group size to the weighted instruction count per instruction.

6. The system of claim 1, wherein an execution ratio is computed for the sequence of the instructions based on monitoring for additional events that include the instruction grouping information.

7. The system of claim 1, wherein the sequence of the instructions comprises a basic block of the instructions having a single entry point and a single exit point.

8. A computer program product for performance profiling of an application, the computer program product comprising a computer readable storage medium having program instructions embodied therewith, the program instructions executable by a processor to cause the processor to:
    execute an instruction stream of the application comprising a plurality of instructions that is dynamically grouped at run-time by a grouping unit that groups multiple instructions from the instruction stream together which are issued as a group of instructions from an issue unit to one or more execution units for simultaneous completion;
    monitor for an event associated with an instruction from the instruction stream identified as a sampled instruction;
    associate the sampled instruction with other events that include instruction grouping information;
    determine a number of the instructions completed simultaneously in a group that includes the sampled instruction as a group size;
    track the monitored event as a plurality of separate events with respect to each of the sampled instruction and one or more other instructions of the group;
    track a plurality of subsequent monitored events as the separate events for each of the sampled instruction and one or more other instructions from additional groups of the instructions having various group sizes formed from a sequence of the instructions; and
    generate an execution count for the sequence of the instructions based on accumulating the separate events over a period of time.

9. The computer program product of claim 8, wherein monitoring for the monitored event is performed periodically based on a sampling interval.

10. The computer program product of claim 8, wherein the separate events are tracked as instruction counts for each different value of the group size, and the execution count is based on a summation of the instruction counts for each different value of the group size on an instruction basis and computed across the sequence of the instructions.

11. The computer program product of claim 8, wherein the separate events are tracked as a number of cycles for each different value of the group size, a weighted instruction count per instruction is computed on a group size basis, a plurality of calculated instruction counts is determined based on the weighted instruction count per instruction and the number of cycles for each different value of the group size, and the execution count is based on a summation of the calculated instruction counts for each different value of the group size on an instruction basis and computed across the sequence of the instructions.

12. The computer program product of claim 11, wherein the calculated instruction counts are determined by computing a ratio of the number of cycles for each different value of the group size to a total number of cycles per instruction and applying the ratio for each different value of the group size to the weighted instruction count per instruction.

13. The computer program product of claim 8, wherein an execution ratio is computed for the sequence of the instructions based on monitoring for additional events that include the instruction grouping information.

14. The computer program product of claim 8, wherein the sequence of the instructions comprises a basic block of the instructions having a single entry point and a single exit point.

* * * * *